United States Patent [19]
Berg, Jr. et al.

[11] Patent Number: 5,369,223
[45] Date of Patent: Nov. 29, 1994

[54] APPARATUS FOR WEIGHING AND PROCESSING MATERIALS

[75] Inventors: Vernon R. Berg, Jr.; Monte W. Haugland, both of Marshfield, Wis.

[73] Assignee: Sand Mark Corp., Marshfield, Wis.

[21] Appl. No.: 877,758

[22] Filed: May 4, 1992

[51] Int. Cl.[5] .............................................. G01G 5/04
[52] U.S. Cl. ................... 177/208; 177/230; 177/256; 177/258; 177/254; 177/54
[58] Field of Search .............. 177/208, 254, 258, 83, 177/84, 85, 86, 54, 170, 230, 256

[56] References Cited

U.S. PATENT DOCUMENTS

| | | | |
|---|---|---|---|
| 1,656,791 | 1/1928 | Henderson | 177/208 |
| 1,798,076 | 3/1929 | Frisch | 177/208 |
| 2,427,190 | 9/1947 | Bradley et al. | 177/83 |
| 2,795,410 | 6/1957 | Reynard | 177/208 |
| 2,818,737 | 1/1958 | Barrett et al. | 177/208 |
| 3,041,733 | 7/1962 | Friend | 177/208 |
| 3,058,341 | 10/1962 | Heintzmann | 177/208 |
| 3,145,794 | 8/1964 | Calongne et al. | 177/208 |
| 3,261,203 | 7/1966 | Young | 177/208 |
| 3,378,090 | 4/1968 | Christie | 177/208 |
| 3,580,422 | 5/1971 | Hartley | 177/208 |
| 3,612,490 | 10/1971 | Bopp et al. | 177/145 X |
| 3,633,696 | 1/1972 | Kleysteuber | 177/208 |
| 3,637,034 | 1/1972 | Wickenberg | 177/208 |
| 4,084,651 | 4/1978 | Lagneau | 177/254 X |
| 4,130,171 | 12/1978 | Smith et al. | 177/1 |
| 4,219,090 | 8/1980 | Dayton | 177/208 |
| 4,423,961 | 1/1984 | Steiner | 366/183 |
| 4,852,675 | 8/1989 | Wang | 177/208 |
| 5,143,165 | 9/1992 | Hough | 177/59 |

OTHER PUBLICATIONS

Knight's American Mechanical Dictionary, Houghton, Mifflin & Co. (1876) pp. 2049–2050.

*Primary Examiner*—Benjamin R. Fuller
*Assistant Examiner*—Randy W. Gibson
*Attorney, Agent, or Firm*—Ryan, Kees & Hohenfeldt

[57] ABSTRACT

Apparatus for processing materials including a receptacle for containing and processing fluid materials such as animal feed. A frame supports the receptacle on a base surface. A weighing mechanism supports the frame and includes at least one member yieldable proportionally in response to the weight of materials contained in the receptacle. An arm connected to the yieldable member is movable in response to its movement. An enclosed collapsible container or bellows having circumferentially corrugated cylindrically-shaped sidewalls and first and second closed ends has a first end being supported by a fixed support. The second end is aligned with, and movable in response to, movement of the arm. A conduit in fluid flow communication with the interior of the collapsible container is at its other end visually transparent, vertically aligned, open to the atmosphere, and contains a liquid. A visually readable scale is calibrated to produce readings indicative of the weight contained in said receptacle based on the visual height of liquid in the conduit.

12 Claims, 5 Drawing Sheets

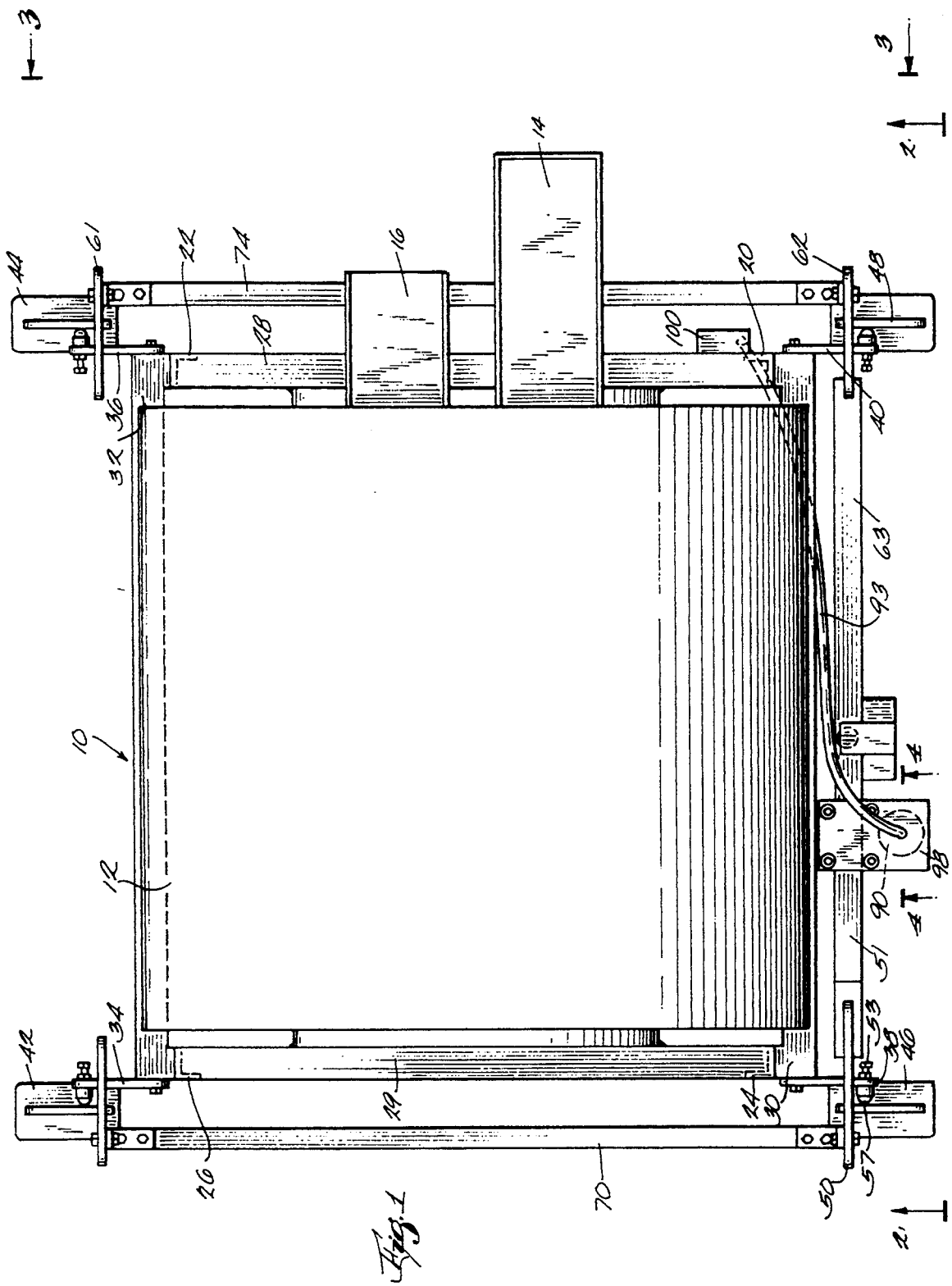

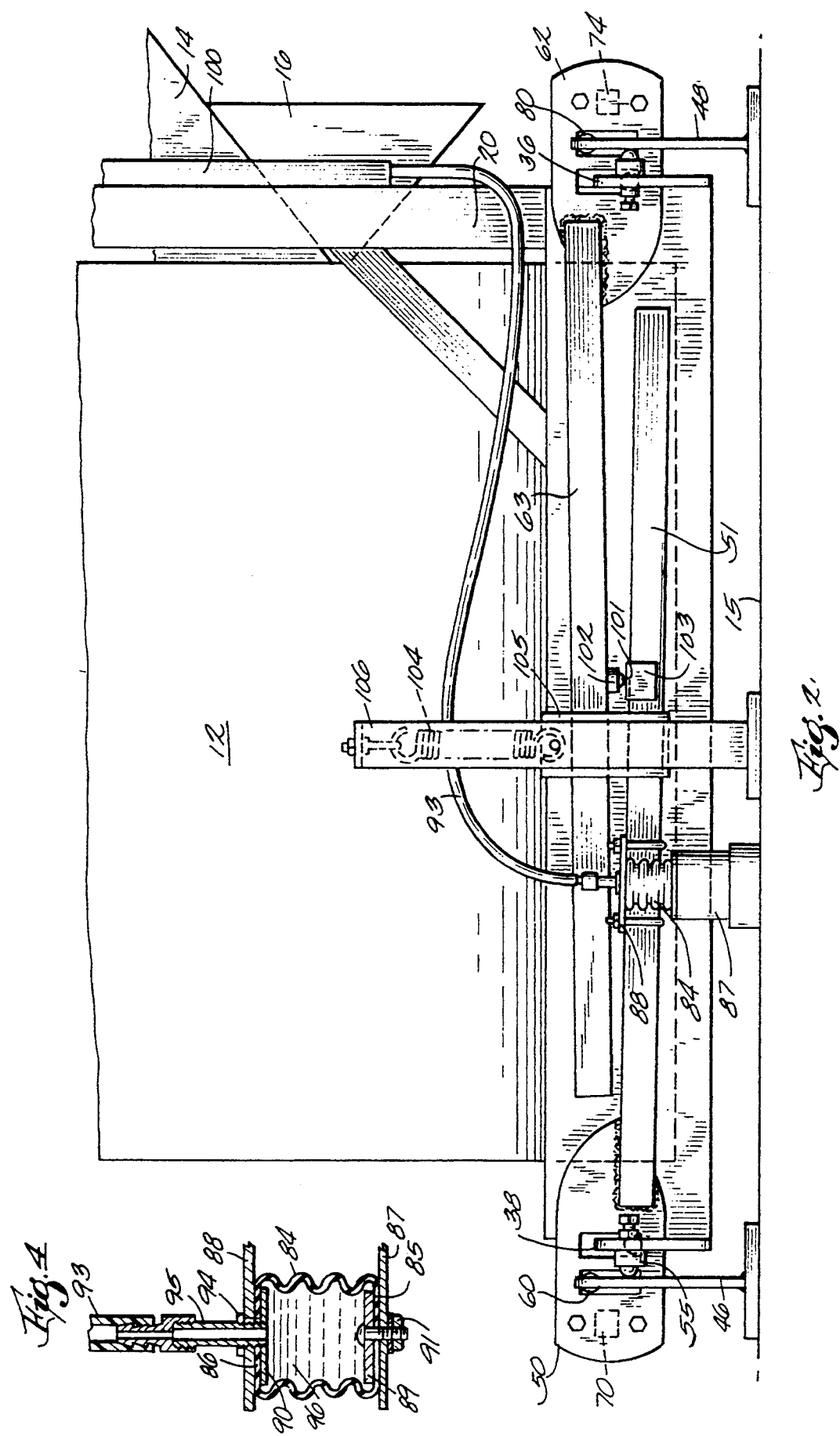

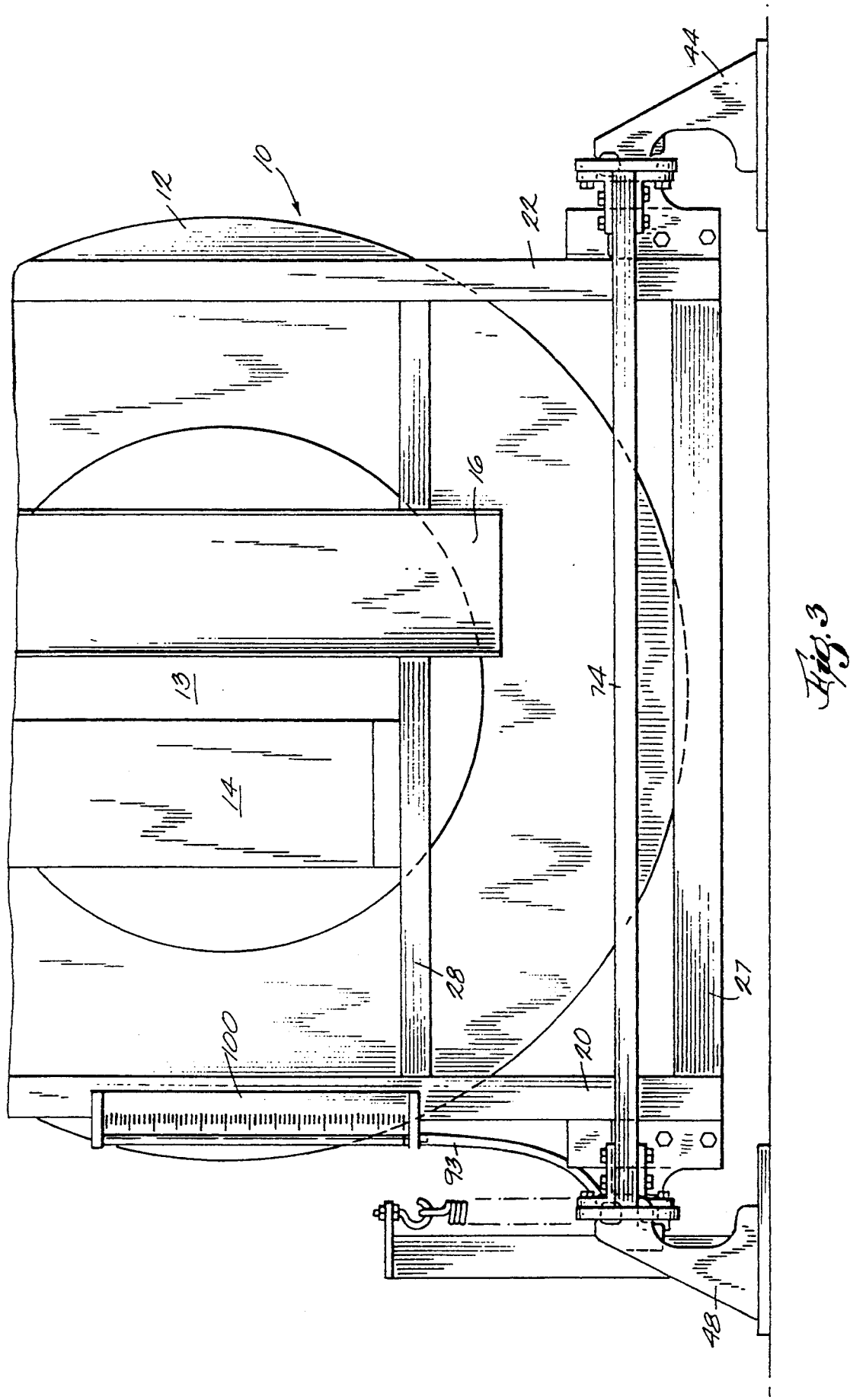

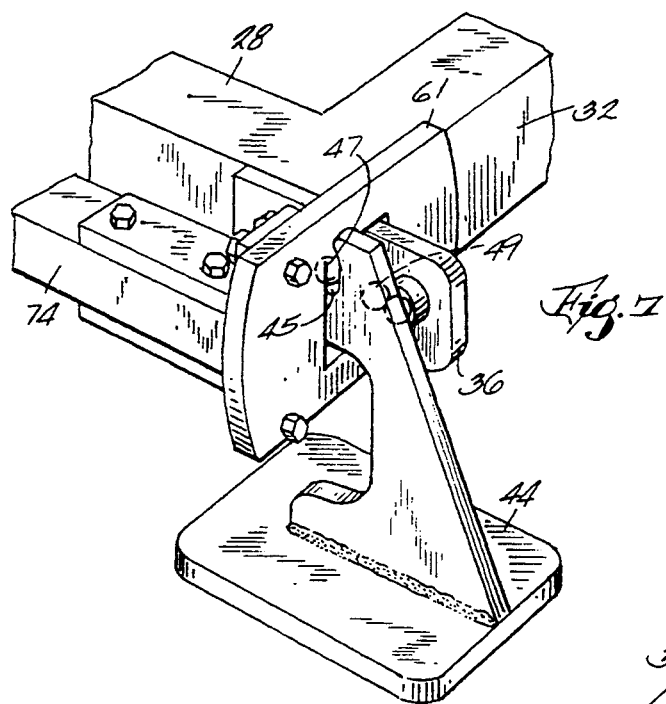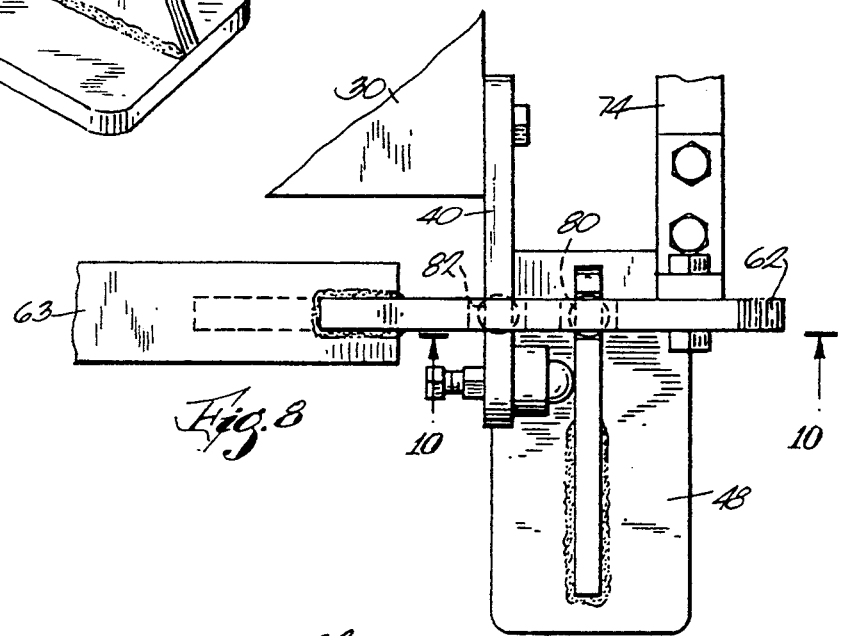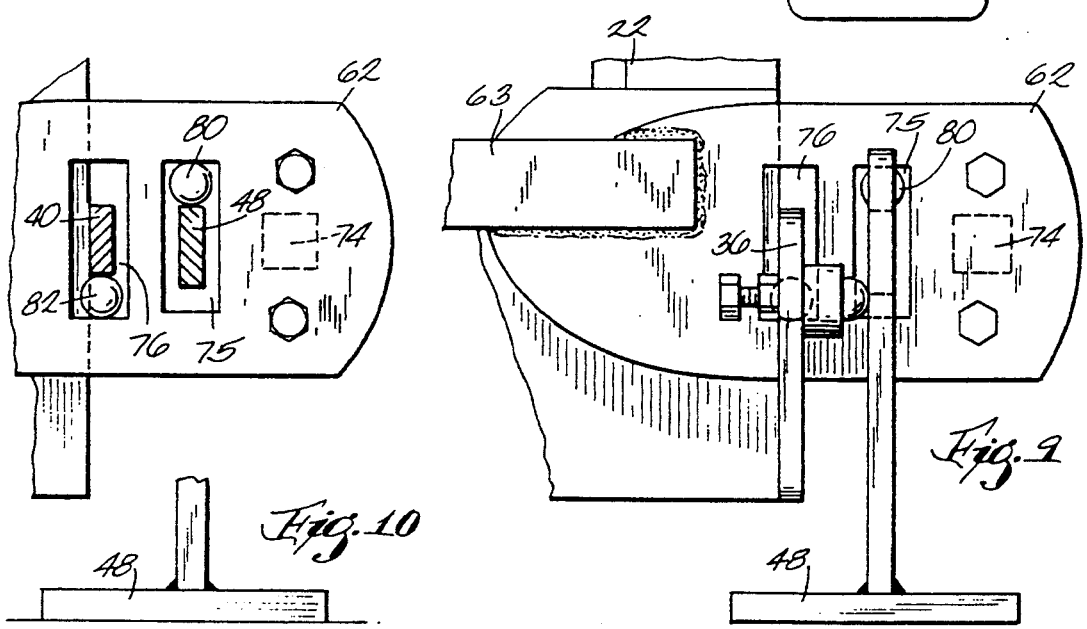

APPARATUS FOR WEIGHING AND PROCESSING MATERIALS

BACKGROUND OF THE INVENTION

This invention relates to materials handling or processing equipment having an improved weighing mechanism. More specifically, the invention relates to vessels or receptacles such as tanks, rotary drums or other processing containers or platforms for materials having a scale mechanism incorporated therewith utilizing an improved variable volume fluid containing component which is connected with a calibrated scale to provide accurate weight readings of the contents of the vessel.

Heretofore, various weighing mechanisms have been used, many of such devices being simple calibrated stress-strain devices utilizing springs or weights. Rotatable mixing drums for livestock feed have been provided with fluid scales in which the mechanism actuates a small pneumatic cylinder connected to a transparent plastic tube open at the opposite end which in turn is attached to a graduated scale. Such devices have been found to be of limited accuracy in that fluid leaks from the cylinders, throwing the system out of calibration.

Another proposal for providing weighing devices has been to utilize load cells having corrugated cylindrical walls, for example, as shown in U.S. Pat. No. 4,219,090. Another such device is shown in U.S. Pat. No. 1,656,791. These devices relied upon the bellows-type member to compress air or a liquid in order to provide an indication on a pressure gauge. This gauge was then calibrated to provide an indication of the weight being applied to the device. Such devices, however, require a non-linear scale calibration due to the increasingly reduced amount of movement of the scale indicator device when the pressure within the bellows increases. Such devices also have not gained wide acceptance because of the fact that the required pressures make the devices subject to leakage and loss of accuracy.

In view of these and other shortcomings of the prior art devices, a need has continued to exist for improved scale mechanisms for materials processing receptacles. Such receptacles include those used for containment, processing or mixing fluid material such as liquids, comminuted solids, or gaseous materials. Such containers or receptacles can include various vessels such as tanks, rotatable mixing drums or the like. The invention is particularly useful for providing improved scale mechanisms for use in conjunction with rotatable drums for mixing of animal feeds.

BRIEF SUMMARY OF THE INVENTION

The invention includes a load supporting member provided with a support structure, such as a framework and legs suitable for supporting the member on the ground, a floor or similar base surface. The framework is supported off of the base surface by the weighing device. The weighing device includes a movable component that moves in response to the amount of weight of the load. Preferably, a resilient means such as a spring or torsion rod is utilized to bias the movable component toward the vessel-empty position assumed by the load supporting member when it is not carrying a load.

The weighing mechanisms of this invention include an enclosed variable volume chamber or bellows having one end fixed either directly to the base surface or to another component fixed in relation to the base surface. The other end of the bellows is connected to the movable component so that an increase in load or weight in the vessel causes a reduction in the length of the bellows. The bellows is connected to a plastic tube or similar conduit which is open to the atmosphere at its opposite end. The conduit includes a vertical section near its open end that is fixed to a graduated scale for indication of the weight in the vessel. The bellows and conduit contain a liquid, the meniscus of which is visible in the conduit adjacent the scale. The movement of the bellows reduces the length and volume thereof and thus expels liquid therefrom into the conduit whereby readings can be observed on the graduated scale.

The invention will be set forth in greater detail in the following detailed description and accompanying drawings wherein:

FIG. 1 is a top plan view of a rotatable mixing drum used in conjunction with a weighing device of this invention;

FIG. 2 is a side plan view of the device of FIG. 1 taken along line 2—2 with the upper part thereof broken away;

FIG. 3 is a front plan view of the apparatus shown in FIG. 2;

FIG. 4 is a cross-sectional view of the bellows component of the present invention taken along line 4—4 of FIG. 1;

FIG. 7 is a perspective view of a supporting component used at the diagonally opposite corner of the mechanism from that viewed in FIG. 2;

FIG. 8 is a top plan view with parts broken away of the support mechanism at a different corner of the mechanism with parts broken away;

Figure 5:
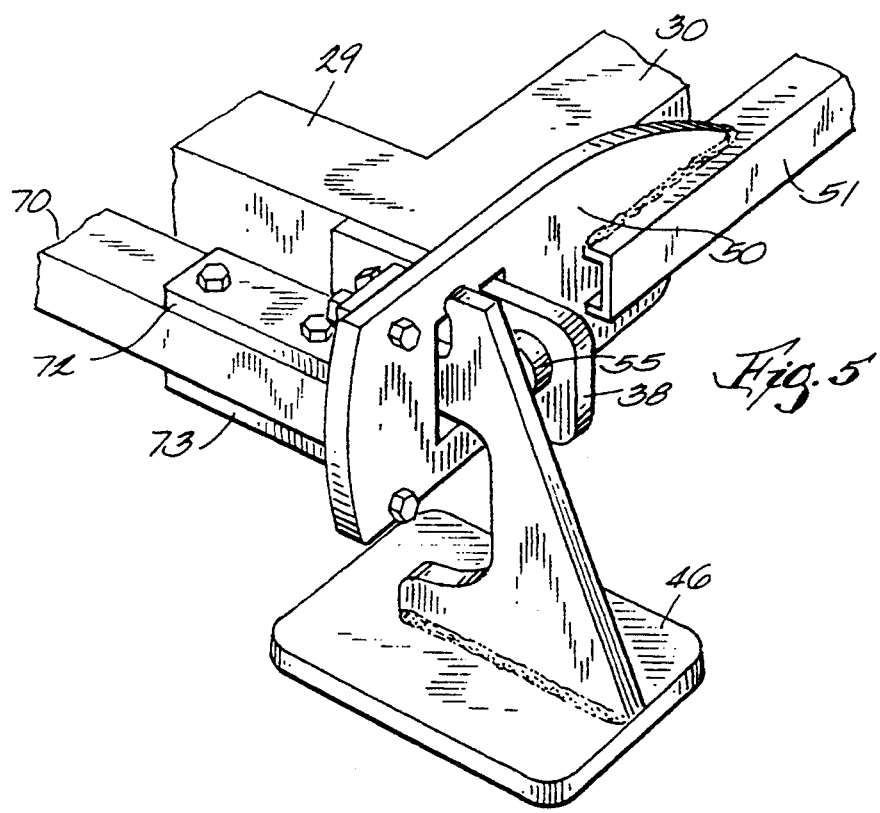
FIG. 5 is a broken away perspective view of the support mechanism used in conjunction with the illustrated embodiment of the invention.

FIG. 9 a side plan view of the component shown in FIG. 8; and

FIG. 10 is a cross-sectional view taken along line 10—10 of FIG. 8.

DETAILED DESCRIPTION

Receptacle 10 is shown for purposes of illustration to be an animal feed mixing device utilizing a rotatable drum 12. It is desirable to have the ability to weigh the amount of materials contained within drum 12.

Drum 12 is driven in conventional fashion by means of an electric motor (not shown). Rotatable drum 12 is provided with an opening at one end through a non-rotatable central portion 13 to which are attached a hopper 14 leading to an inlet and a discharge chute 16. The interior of the drum may be provided with mixing blades in known fashion.

A framework formed from metal structural materials supports drum 12. These include vertical members 20, 22, 24 and 26. Laterally extending members 27, 28, 29 also provide part of the framework as do side members 30 and 32.

Laterally extending support members 34, 36, 38 and 40 are provided at the lower part of the framework at each of the four corners of the framework. These lateral extending members join four supporting legs 42, 44, 46 and 48 as will be hereinafter explained. The supporting legs are placed on a floor, the ground or other supporting surface 15.

Figure 6:
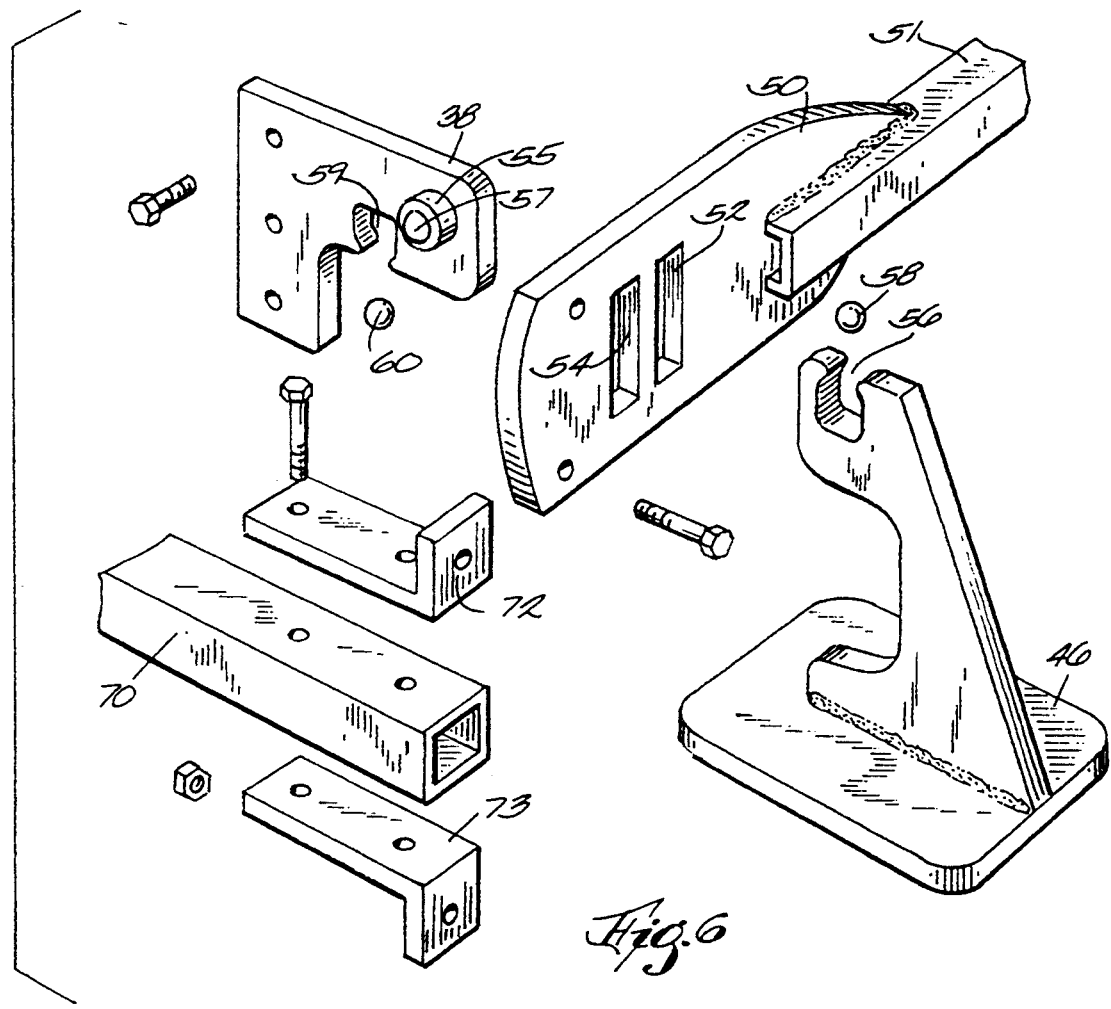
FIG. 6 is a perspective view of the components of FIG. 5 with parts broken away for greater clarity.

Referring to FIGS. 2, 5 and 6 the mode of supporting the framework on the supporting legs will first be explained with reference to leg 46. In order for the scale mechanism to work accurately it is important that the movable components be capable of pivoting freely when the amount of weight in drum 12 changes. The scale mechanism includes an apertured plate 50 that is welded to an arm 51. Plate 50 is provided with slots 52 and 54. Slot 52 is adapted to be positioned over notch 56 in the top of supporting leg 46. Ball bearing 58 is positioned so as to be captured in notch 56 and slot 52 when the parts are assembled as seen in FIG. 5. It will thus be appreciated that arm 51 can pivot readily upon leg 46. Slot 54 is adapted to receive the end of lateral support arm 38 which is likewise provided with a notch 59. Another ball bearing 60 is captured between notch 59 and slot 54 when the parts are assembled. Thus the weight of drum 12 is transferred to plate 50 and arm 51 in a non-binding fashion to facilitate pivoting of the scale mechanism. Another ball 57 can be captured in a bushing 55 so that is rides against the side of the upper portion of leg 46 when the parts are assembled. Bearing 57 provides the function of minimizing vibration in the scale mechanism in the event that the load within drum 12 causes vibration due to eccentricity.

Bars 70 and 74 tie together the opposite sides of the support frame and act to transfer forces so as to account for uneven weight distribution within the drum. As seen in FIG. 6 in the end of rod 70 is attached by bracket 72 and 73 to the outer end of pivotable arm 50, 51. A second pivot arm 63 overlies arm 51 and it is welded to a second plate 62 which is mounted on leg 48 in similar fashion to that by which plate 50 is supported on leg 46. Lateral arm 40 is likewise supported in a slot in plate 62 in similar fashion to lateral arm 38.

As seen in FIG. 7 the side of drum 12 opposite that on which lever arms 51 and 63 are located utilizes a similar supporting principal with the exception of the absence of the lever arms. In this case plate 61 is provided with slots to receive the lateral arm 36 and a slot notch 45 at the upper end of supporting leg 44 which captures a ball bearing 47 between plate 61 and notch 45. Another ball bearing 49 supports lateral arm 36 within its slot.

As seen in FIGS. 8–10 plate 62 and arm 63 are supported and operate in a fashion similar to plate 50 and arm 51. Plate 62 is provided with slot 75 and 76 that receive the upper portion of leg 48 and lateral support arm 40, respectively. The plate 62 is pivotally supported on leg 48 by means of ball bearing 80 while support arm 36 carries its portion of the load of drum 12 being pivotally supported on ball bearing 82 as best seen in FIG. 10.

Attached to arm 51 at a point spaced from the downwardly applied load transferred to arm 50, 51 by lateral support arm 38 is a corrugated cylindrical variable volume compartment 84. Compartment 84 is formed from a rubber walled corrugated member. Note in FIG. 2 that support 46 which rests on base surface 15 provides a fulcrum point for lever arm 50, 51 and that with a magnified effect produced by arm 51 on both container or bellows 84 a third class lever mechanism is utilized in connection with the preferred embodiment of the scale mechanism illustrated in the drawings.

As best seen in FIG. 4 the collapsible container or bellows 84 is provided with closed ends 85 and 86. End 85 is sealed in fluid-tight fashion to a metal plate 87 by means of an internal washer which upon tightening a nut 91 on a threaded shaft welded to the washer forms a fluid-tight seal clamping end 85 to metal bracket 87. In similar fashion the upper end of collapsible container 84 is clamped against another bracket 88 by means of washer 90 with the assembly being clamped in place by means of nuts 92 and 94 to provide a fluid-tight seal. Nut 94 is threaded on a hollow metal nipple 95 which is threaded into washer 90 to a flexible rubber or plastic conduit 93 to the interior of collapsible container 84. A liquid medium 96 which may, for example, by hydraulic oil is contained in container 84 and conduit 93. The opposite end of conduit 93 is open to the atmosphere and is vertically oriented adjacent to a graduated scale 100. At least the vertical section of conduit 93 adjacent scale 100 is transparent so that the meniscus formed by the liquid 96 is visible adjacent the scale 100. Scale 100 is appropriately calibrated to indicate the weight contained in drum 12. Preferably container 84 is configured so as to collapse at a uniform rate as arms 51, 63 cause it to collapse. Then a uniform rate of expulsion of fluid is provided as the container collapses.

A ball bearing 101 contained within a cylindrical bushing 102 rides on a bracket 103 attached to arm 51. In this fashion weight applied to arm 63 via support arm 36 is also transferred by way of arm 63 to the collapsible container 84.

In accordance with the preferred embodiment a reaction spring 104 is attached at one end to arm 51 by means of a bracket 105. The opposite end of reaction spring 104 is supported off of base surface 15 by means of a support pedestal 106 to which spring 104 is attached at its upper end. It will be noted that the long lever arms to which spring 104 are attached enable it to counterbalance the relatively high weight in the drum 12 which is supported on much shorter lever arms thereof. Springs having varying spring constants can be used for spring 104 provided that scale 100 is graduated at intervals appropriate for the particular spring selected.

While specific embodiments of the invention are shown herein, various modifications within the spirit of the invention will be apparent to those skilled in the art.

What is claimed is:

1. Apparatus for processing fluid materials and having a means for weighing incorporated therein comprising:

a receptacle for containing and processing fluid materials, said fluid materials having a weight to be determined, a frame for supporting said receptacle on a base surface, a weighing mechanism supporting said frame comprising at least one spring supported on said base surface yieldable proportionally in response to weight of said fluid materials contained in said receptacle, at least one arm pivotably supported on said base surface, said arm supporting said frame and being connected to said spring and being movable in response to movement thereof, an enclosed collapsible container having circumferentially corrugated cylindrically-shaped sidewalls and a first closed end and a second closed end defining an enclosed interior, said first closed end being supported by a fixed support, said second closed end being aligned and in contact with said arm, a conduit having a first end and a second end, the first end thereof being in fluid flow communication with said enclosed interior of said collapsible container, the second end of said conduit being visually transparent, vertically aligned and open to ambient atmosphere, a liquid contained in a confined space defined by said interior of said collapsible container and said conduit, said liquid extending into said vertically aligned second end of said conduit to a height corresponding to a weight of the fluid materials in said receptacle, and a visually readable scale for reading said height of said liquid contained in said vertically aligned end of said conduit, said scale being calibrated to produce readings indicative of said weight of said fluid materials contained in said receptacle.

2. Apparatus according to claim 1 wherein said receptacle comprises a rotatable drum.

3. Apparatus according to claim 2 wherein said fluid material comprises finely divided flowable solid materials.

4. Apparatus according to claim 3 wherein said materials comprise animal feed.

5. Apparatus according to claim 1 wherein said arm comprises a third class lever arm pivotally supported by a fulcrum supported on said base surface, said frame being supported on said lever arm a short distance from said fulcrum, the volume of said collapsible container being reducible by movement of the lever arm.

6. A device according to claim 1 wherein said collapsible container is vertically supported beneath said arm and wherein said fixed support comprises said base surface.

7. Apparatus according to claim 1 wherein said frame is supported on said weighing mechanism by four ball bearings which underlie laterally extending arms attached to the four corners at the bottom of said frame.

8. Apparatus according to claim 5 wherein a lever arm on each of two sides of said receptacle is supported on a supporting leg that comprises a fulcrum, a ball bearing being positioned between the top of said fulcrum and the supporting surface of said arm.

9. Apparatus according to claim 8 wherein one of said arms is positioned on said collapsible container and the other arm is supported on the top of said first arm by means of a ball bearing positioned between said arms.

10. Apparatus according to claim 9 wherein said first arm is supported above said base surface by means of a reaction spring.

11. Apparatus for weighing materials comprising:

a collapsible container having an enclosed interior defined by circumferentially corrugated cylindrically-shaped sidewalls, a first closed end and a second closed end, said first end being supported by a fixed support, said second end being aligned and in contact with a deflectable arm that is connected to a member supporting a load to be weighed, said deflectable arm being progressively deflected as said load increases in weight thereby causing the volume of the enclosed interior of said collapsible container to be reduced in response to said increase in weight of said load, said deflectable arm being biased by a yieldable spring supported on said fixed support toward the position assumed by said load supporting member when said load supporting member is not supporting a load, a conduit having a first end in fluid flow communication with said interior of said collapsible container through one of said first or second closed ends of said collapsible container, said conduit having a second end that is visually transparent, vertically aligned and open to the earth's atmosphere, a liquid contained in said collapsible container and said conduit, and a visually readable scale for reading a height of fluid contained in said vertically aligned end of said conduit, said scale being calibrated to produce readings indicative of the weight of said load.

12. Apparatus for processing fluid materials, Said apparatus having means for weighing incorporated therein, comprising:

a receptacle for containing and processing fluid materials, said fluid materials having a weight to be determined, a frame for supporting said receptacle on a base surface, a weighing mechanism supporting said frame comprising at least one spring supported on said base surface yieldable proportionally in response to weight of said fluid materials contained in said receptacle, a pair of arms pivotably supported on said base surface, a first one of said arms supporting one side of said frame and being connected to said spring and being movable in response to movement thereof and a second one of said arms supporting a side of said frame opposite said one side of said frame and being supported on said first arm, an enclosed collapsible container having circumferentially corrugated cylindrically-shaped sidewalls and first and second closed ends defining an enclosed interior, said first end being supported by a fixed support, said second end being aligned and in contact with a first one of said arms, the second one of said arms being supported on said first one of said arms a conduit having a first end and a second end, said first end being in fluid flow communication with said enclosed interior of said collapsible container, said second end of said conduit being visually transparent, vertically aligned and open to ambient atmosphere, a liquid contained in a confined space defined by said interior of said collapsible container and said conduit, said liquid extending into said vertically aligned second end of said conduit to a height corresponding to a weight of the fluid materials in said receptacle, and a visually readable scale for reading said height of said liquid contained in said vertically aligned end of said conduit, said scale being calibrated to produce readings indicative of said weight of said fluid materials contained in said receptacle.

* * * * *